US008285120B2

(12) United States Patent
Ino (10) Patent No.: US 8,285,120 B2
(45) Date of Patent: Oct. 9, 2012

(54) VIDEO MATERIAL MANAGEMENT APPARATUS AND METHOD, RECORDING MEDIUM AS WELL AS PROGRAM

(75) Inventor: Yuji Ino, Tokyo (JP)

(73) Assignee: Sony Corporation, Tokyo (JP)

( * ) Notice: Subject to any disclaimer, the term of this patent is extended or adjusted under 35 U.S.C. 154(b) by 1223 days.

(21) Appl. No.: 11/220,042

(22) Filed: Sep. 6, 2005

(65) Prior Publication Data

US 2006/0051054 A1 Mar. 9, 2006

(30) Foreign Application Priority Data

Sep. 7, 2004 (JP) ................ P2004-260079

(51) Int. Cl.
*H04N 5/93* (2006.01)
*H04N 9/80* (2006.01)
(52) U.S. Cl. .............. 386/278; 386/241; 386/248
(58) Field of Classification Search .............. None
See application file for complete search history.

(56) References Cited

U.S. PATENT DOCUMENTS

| 4,305,101 | A | * | 12/1981 | Yarbrough et al. ......... 360/69 |
| 5,467,288 | A | | 11/1995 | Fasciano et al. |
| 5,682,326 | A | * | 10/1997 | Klingler et al. ............ 715/202 |
| 6,292,620 | B1 | | 9/2001 | Ohmori et al. |
| 6,332,147 | B1 | * | 12/2001 | Moran et al. .............. 715/203 |
| 6,366,296 | B1 | * | 4/2002 | Boreczky et al. ........... 715/719 |
| 6,404,978 | B1 | | 6/2002 | Abe |
| 6,477,315 | B1 | | 11/2002 | Ohomori |
| 6,879,769 | B1 | * | 4/2005 | Kawai et al. ............... 386/52 |
| 7,187,842 | B2 | * | 3/2007 | Ninomiya ................. 386/52 |
| 2001/0041050 | A1 | | 11/2001 | Iwata et al. |
| 2004/0205515 | A1 | * | 10/2004 | Socolow et al. ........... 715/501.1 |
| 2004/0263529 | A1 | | 12/2004 | Okada et al. |
| 2005/0068570 | A1 | * | 3/2005 | Hart et al. ................ 358/1.15 |
| 2005/0114357 | A1 | * | 5/2005 | Chengalvarayan et al. .. 707/100 |
| 2006/0004914 | A1 | * | 1/2006 | Kelly et al. ............... 709/219 |

FOREIGN PATENT DOCUMENTS

| EP | 0 625 783 | 11/1994 |
| EP | 0 911 829 | 4/1999 |
| JP | 6 348799 | 12/1994 |
| JP | 8 272989 | 10/1996 |
| JP | 11 175618 | 7/1999 |
| JP | 11 205736 | 7/1999 |
| JP | 2001 231006 | 8/2001 |
| JP | 2001 326881 | 11/2001 |
| WO | WO 03 102953 | 12/2003 |

* cited by examiner

*Primary Examiner* — William C Vaughn, Jr.
*Assistant Examiner* — Heather Jones
(74) *Attorney, Agent, or Firm* — Frommer Lawrence & Haug LLP; William S. Frommer; Thomas F. Presson (57) ABSTRACT

The apparatus displays a GUI screen that includes an image display section, and a time-position information display section for displaying time-position information on a video material. A preview operation unit is used to preview the video material. Scene setting operation units are used for setting a certain range of the video material as a scene; wherein based on the setting of a scene by the scene setting operation units with respect to the material displayed in the image display section, ranges of scenes are displayed discriminatively in the time-position information display section. An input section for the input of a comment on the scene that is set in the scene setting operation units is displayed, and the comment input into this input section is stored.

5 Claims, 10 Drawing Sheets

| Title | Title Stamp | File Name | Material ID | Creation Date | Duration |
|---|---|---|---|---|---|
| News | | OOOOO OOO.avi | OOOO OOO | 6/19/2004 | 00:03:21:17 |
| Sports | | OOOOO OOO.avi | OOOO OOO | 6/19/2004 | 00:02:08:21 |
| Travel | | OOOOO OOO.avi | OOOO OOO | 6/18/2004 | 00:10:15:06 |
| ...... | ...... | ...... | ...... | ...... | ...... |

VIDEO MATERIAL MANAGEMENT APPARATUS AND METHOD, RECORDING MEDIUM AS WELL AS PROGRAM

CROSS REFERENCES TO RELATED APPLICATIONS

The present invention contains subject matter related to Japanese Patent Application JP 2004-260079 filed in the Japanese Patent Office on Sep. 7, 2004, the entire contents of which being incorporated herein by reference.

BACKGROUND OF THE INVENTION

1. Field of the Invention

The present invention relates to an apparatus, a method, and so forth for specifying and managing a certain range of a recorded video material.

2. Description of the Related Art

Lately, a recording, editing, and transmitting system using a video server has been introduced in television broadcasting stations. In this system, typically it is possible to perform trimming (operation of clipping a necessary portion from a material) on a GUI screen while previewing a recorded video material (for example, refer to Patent Reference 1).

[Patent Reference 1] Published Japanese Patent Application No. H6-348799 (paragraphs No. 0020 through 0023, FIG. 2)

SUMMARY OF THE INVENTION

Since a number of video materials are copyrighted, there are many cases where a copyrighted scene is contained over a certain range in a material clipped by trimming. When the material is practically broadcasted, it is necessary to obtain a permission from the owner of copyright and to pay a royalty for the scene.

Therefore, it is desirable that a copyrighted range is specified in a video material when performing a preview for trimming and that additional information (meta-data) is formed to show the copyrighted range. However, it has been difficult in a recording, editing, and transmitting system of related art to specify and manage a certain range of a video material as described above.

The present invention addresses the above-identified, and other problems associated with conventional methods and apparatuses; and provides an apparatus, method, recording medium and program in which a certain range of a video material is specified and managed at the time of previewing the video material.

A video material management apparatus according to an embodiment of the present invention is configured to have first processing means for displaying on display means a GUI screen including an image display section, a time-position information display section for displaying time-position information on a video material continuously from beginning to end, a preview operation unit for previewing the video material, and a scene setting operation unit for setting a certain range of the video material as a scene; second processing means for displaying in the image display section a video material reproduced from recording means and for displaying the time-position information on the video material in this time-position information display section in accordance with an operation of the preview operation unit; third processing means for storing the range of the scene based on the setting of the scene in the scene setting operation unit with respect to the video material displayed in the image display section and for displaying the range of the scene discriminatively in the time-position information display section; fourth processing means for displaying on the display means an input section for the input of a comment on the scene set in the scene setting operation unit; and fifth processing means for storing the comment input into the input section.

In this video material management apparatus, on the display means is displayed the GUI screen including: the image display section, the time-position information display section for displaying the time-position information on the video material continuously from beginning to end, the preview operation unit for previewing the video material, and the scene setting operation unit for setting a certain range of the video material as the scene.

Then, when the preview operation unit is operated, the video material reproduced from the recording means is displayed in the image display section, and the time-position information on the video material is displayed in the time-position information display section.

When an arbitrary range of the video material (for example, a copyrighted range) is set as a scene in the scene setting operation unit while previewing the video material in this image display section, the range of the scene is stored and the range thereof is displayed discriminatively in the time-position information display section.

Further, when the input section for the input of a comment on the specified scene is displayed on the display means and an appropriate comment (for example, a comment on the scene being copyrighted) is input into this input section, the comment is stored.

Thus, a certain range of a video material is set as a scene while previewing the video material; the scene can be confirmed in the time-position information display section in which the time-position information on the video material is displayed; also the comment on the scene can be input; and the range of the scene that is set and the comment that is input are stored as additional information (meta-data).

Accordingly, both of an operation of previewing and an operation of specifying and managing a certain range of a video material can be performed under a unified operation environment at the time of previewing the video material. As a result, a certain range of a video material can be specified and managed efficiently at the time of previewing the video material.

Here, as an example, it is preferable that the video material management apparatus is configured to further include processing means for displaying on the display means a selection section to perform an operation of selecting a color to display the scene set in the scene setting operation unit and processing means for displaying the range of the scene in the time-position information display section with the color selected in the selection section.

Hence, it is possible to display the scene in the time-position information display section with a different color according to an attribute of the scene set (for example, whether the scene is copyrighted or is specified due to another reason). Therefore, the attribute of the scene individually set can visually and instantaneously be understood.

Next, a video material management method according to an embodiment of the present invention has: a first step of displaying on display means a GUI screen including an image display section, a time-position information display section for displaying time-position information on a video material continuously from beginning to end, a preview operation unit for previewing the video material, and a scene setting operation unit for setting a certain range of the video material as a scene; a second step of displaying in this image display section a video material reproduced from recording means and of displaying the time-position information on the video material in this time-position information display section in accordance with an operation of the preview operation unit; a third step of storing the range of the scene based on the setting of the scene in the scene setting operation unit with respect to the video material displayed in the image display section and of displaying the range of the scene discriminatively in the time-position information display section; a fourth step of displaying on this display means an input section for the input of a comment on the scene set in this scene setting operation unit; and a fifth step of storing the comment input into the input section.

Further, a recording medium capable of being read by a computer according to an embodiment of the present invention is a recording medium in which a program is recorded to make a computer execute: a first step of displaying on display means a GUI screen including an image display section, a time-position information display section for displaying time-position information on a video material continuously from beginning to end, a preview operation unit for previewing the video material, and a scene setting operation unit for setting a certain range of the video material as a scene; a second step of displaying in this image display section a video material reproduced from recording means and of displaying the time-position information on the video material in this time-position information display section in accordance with an operation of the preview operation unit; a third step of storing the range of the scene based on the setting of the scene in the scene setting operation unit with respect to the video material displayed in the image display section and of displaying the range of the scene discriminatively in the time-position information display section; a fourth step of displaying on the display means an input section for the input of a comment on the scene set in the scene setting operation unit; and a fifth step of storing the comment input into this input section.

Further, a program according to an embodiment of the present invention is a program to make a computer execute: a first step of displaying on display means a GUI screen including an image display section, a time-position information display section for displaying time-position information on a video material continuously from beginning to end, a preview operation unit for previewing the video material, and a scene setting operation unit for setting a certain range of the video material as a scene; a second step of displaying in the image display section a video material reproduced from recording means and of displaying the time-position information on the video material in the time-position information section in accordance with an operation of the preview operation unit; a third step of storing the range of the scene based on the setting of the scene in the scene setting operation unit with respect to the video material displayed in the image display section and of displaying the range of the scene discriminatively in the time-position information display section; a fourth step of displaying on this display means an input section for the input of a comment on the scene set in this scene setting operation unit; and a fifth step of storing the comment input into this input section.

In the video material management method, the computer that executes the program recorded in this recording medium, and the computer that executes this program, on display means is displayed the GUI screen which has the image display section, the time-position information section for displaying the time-position information on the video material continuously from beginning to end, the preview operation unit for previewing the video material, and the scene setting operation unit for setting a certain range of the video material as the scene.

Then, when the preview operation unit is operated, the video material reproduced from the recording means is displayed in the image display section, and the time-position information on the video material is displayed in the time-position information display section.

When an arbitrary range (for example, a copyrighted range) of the video material is set as a scene in the scene setting operation unit while previewing the video material in this image display section, the range of the scene is stored, and the range of the scene is displayed discriminatively in the time-position information display section.

Further, when the input section for the input of a comment on this specified scene is displayed on the display means and an appropriate comment (for example, a comment on the scene being copyrighted) is input into this input section, the comment is stored.

Thus, a certain range of the video material is set as the scene while previewing the video material; the scene can be confirmed in the time-position information display section in which the time-position information on the video material is displayed; also the comment on the scene can be input; and the range of the scene that is set and the comment that is input are stored as additional information (meta-data).

Accordingly, both of an operation of previewing and an operation of specifying and managing a certain range of a video material as a scene can be performed under a unified operation environment at the time of previewing the video material. As a result, a certain range of a video material can be specified and managed efficiently at the time of previewing the video material.

According to the embodiments of the present invention, both of an operation of previewing and an operation of specifying and managing a certain range of a video material as a scene can be performed under a unified operation environment at the time of previewing the video material. Accordingly, it is possible to obtain such an effectiveness that a certain range of a video material can be specified and managed efficiently at the time of previewing the video material.

Moreover, it is also possible to obtain such an effectiveness that an attribute of a scene individually set can visually and instantaneously be understood.

DESCRIPTION OF THE PREFERRED EMBODIMENTS

Hereinafter, embodiments of the present invention is specifically explained using the accompanied drawings. It should be noted that an explanation is hereinafter made with respect to an example in which the present invention is applied to a recording, editing, and transmitting system in a television broadcasting station.

Figure 1:
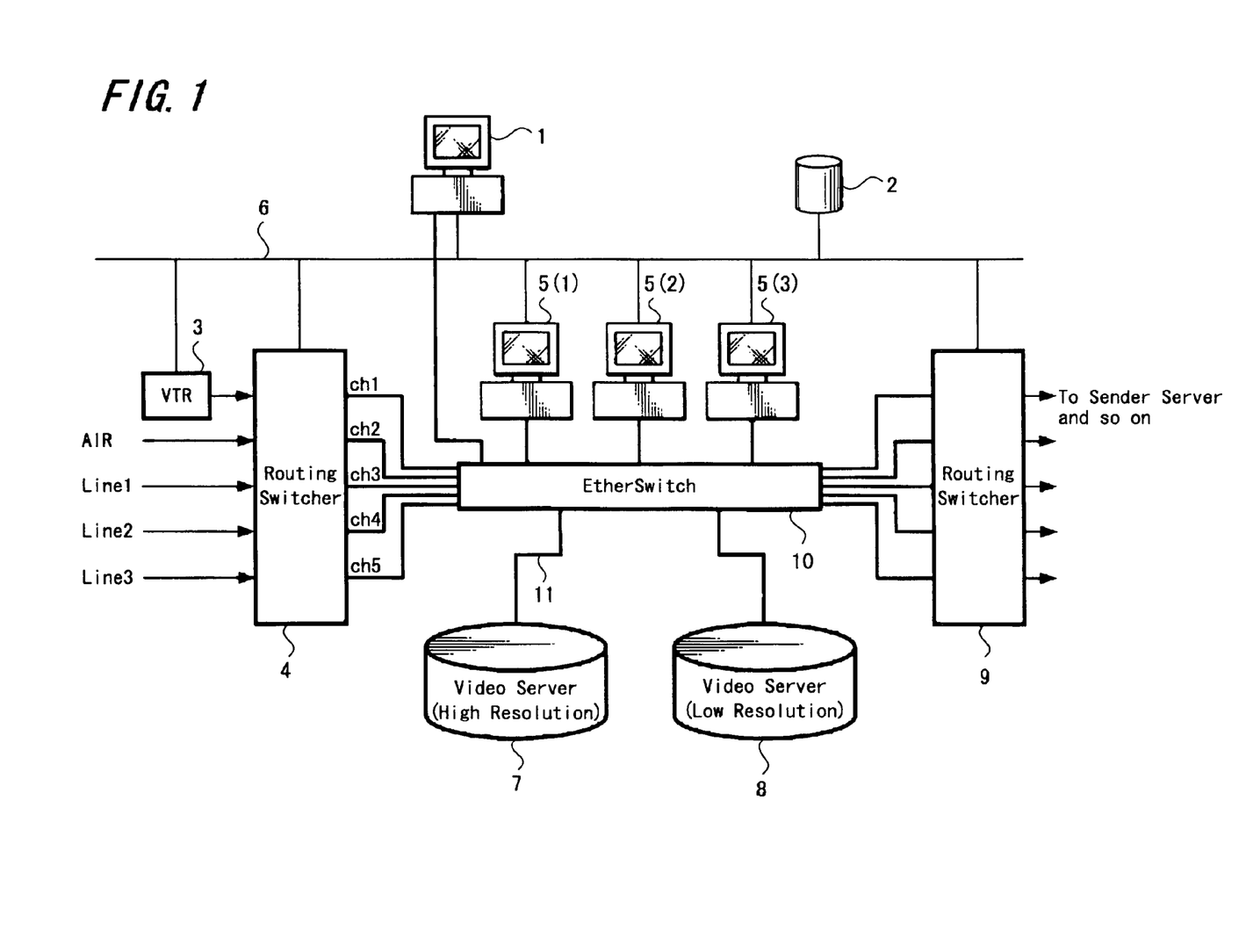
FIG. 1 is a block diagram showing the whole configuration of a recording, editing, and transmitting system according to an embodiment of the present invention.

FIG. 1 is a block diagram showing the whole configuration of a recording, editing, and transmitting system to which the present invention is applied. In this system are mutually connected a management terminal 1, a data base 2, a VTR 3, a routing switcher 4, editing terminals 5(1) through 5(3), and a routing switcher 9 through an Ethernet® 6.

Further, the management terminal 1, the routing switcher 4, the editing terminals 5(1) through 5(3), a video server (for high resolution) 7, a video server (for low resolution) 8, and the routing switcher 9 are mutually connected through a gigabit Ethernet 11 (a portion of boldface line) through an Ether-Switch 10.

The routing switcher 4 is a device for connecting, each of input sources, such as the VTR 3, another broadcasting station (described as AIR in the drawing), and television cameras of shooting locations that are connected by Internet or intranet (described as Lines 1 through 3 in the drawing), to a desired channel among five systems of recording channels ch1 through ch5 of the video servers 7 and 8, respectively. A device that converts data of a SDI format from an input source into a format of the Ethernet is provided in each of the recording channels ch1 through ch5 on the output side of the routing switcher 4, although an illustration thereof is omitted.

The editing terminals 5(1) through 5(3) are terminals that edit a material by using video data of the low resolution (proxy video data) recorded in the video server 8.

The routing switcher 9 is a device to connect transmission channels of a plural systems in the video server 7 respectively to desired sender servers and the like (illustration thereof is omitted) in a broadcasting station. A device that converts data in the format of the Ethernet into the SDI format is also provided in each of the transmission channels on the input side of the routing switcher 9, although an illustration thereof is omitted.

The management terminal 1 is a terminal that controls the whole system to manage recording, editing, and transmission of a material, and includes a computer (for example, work station) that executes software to perform this management. This management software is installed from a recording medium such as a CD-ROM (however, as another example, software may be downloaded and installed through a network). The data base 2 is used for storing various data which are made by the operation of the management terminal 1.

Figure 2:
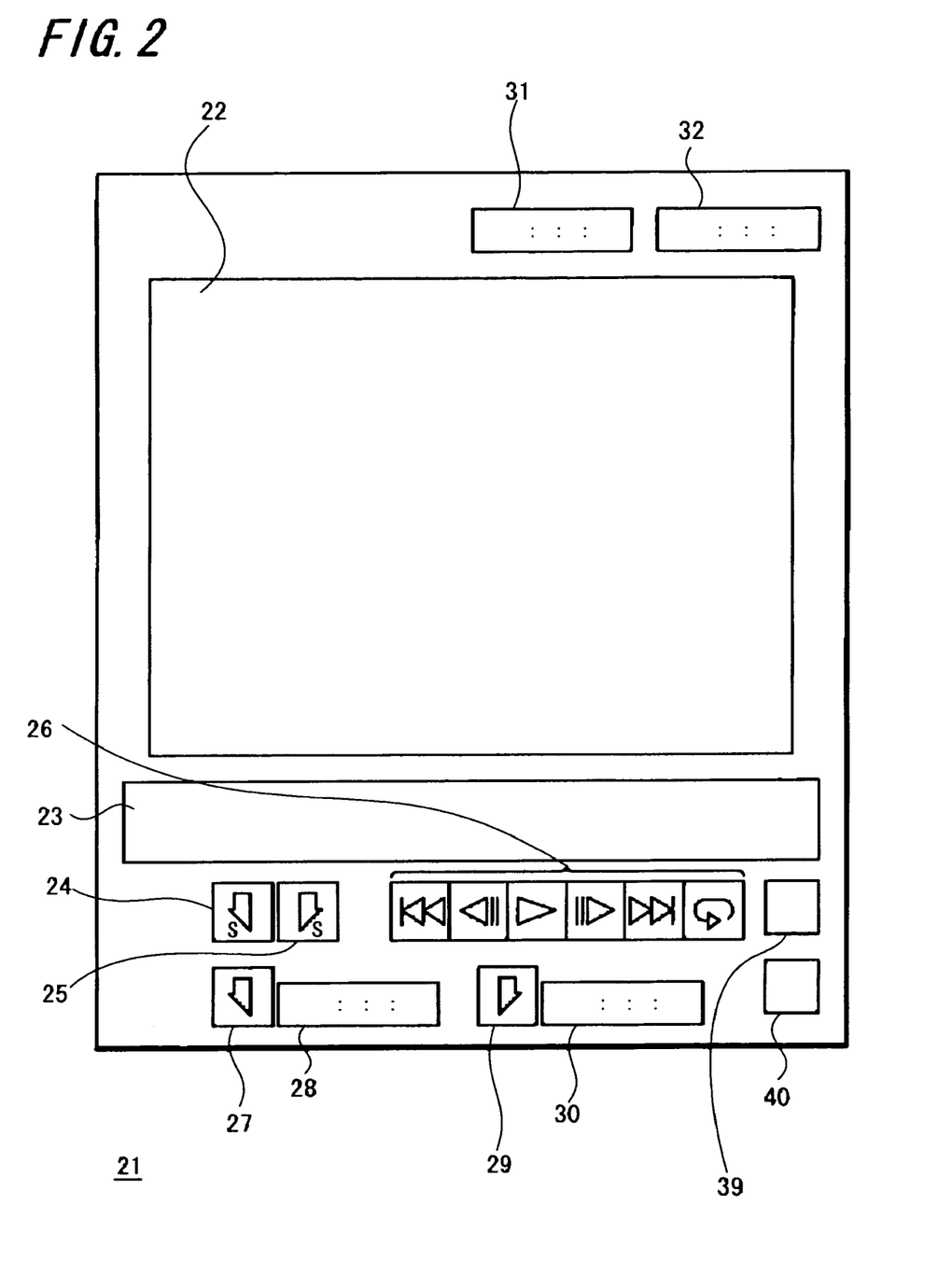
FIG. 2 is a diagram showing a trimmer window displayed on a management terminal of FIG. 1.

FIG. 2 shows a trimmer window 21 among GUI screens displayed on a display of the management terminal 1. This trimmer window 21 is a screen for performing trimming and setting/management of a scene, while previewing a material file after recording a video material.

In this trimmer window 21 are provided a monitor area 22 displaying the image of the material file, and a play line 23 beneath the monitor area. The play line 23 is a section in which time-position information on the material file is displayed from beginning to end continuously in a lateral direction.

A scene-in-point button 24, a scene-out-point button 25, a control button 26, an in-point button 27, an in-point display section 28, an out-point button 29, an out-point display section 30, an overwrite save button 39, and a new file save button 40 are provided on the lower side of the play line 23.

The scene-in-point button 24 and scene-out-point button 25 are buttons for arbitrarily specifying a start point and an end point of the material file so that the range from the start point to the end point is set as a scene.

The control button 26 is a button for previewing the material file, and is made of six buttons having the following functions, provided in the left-to-right direction.

A button to move to the top of the material file
A button to move to a frame immediately before
A button to start reproduction of the material file and to stop the reproduction temporarily
A button to move to the next frame
A button to move to the ending of the material file
A button to reproduce repeatedly from the top of the material file (from an in-point, when the in-point is set by the in-point button 27) to the bottom thereof (to an out-point, when the out-point is set by the out-point button 29).

The in-point button 27 and out-point button 29 are buttons for performing trimming (clipping a portion from an in-point set by the in-point button 27 to an out-point set by the out-point button 29 as a necessary portion). The in-point display section 28 and out-point display section 30 are sections in which time codes of the in-point and out-point respectively set by the in-point button 27 and out-point button 29 are displayed.

The overwrite save button 39 is a button for overwriting and saving a result of operation in this trimmer window 21 onto the existing material file. The new file save button 40 is a button for saving the result of operation in this trimmer window 21 as a new material file.

A present time code section 31 and a duration section 32 are provided on the upper side of the monitor area 22. The present time code section 31 is a section to display a time code of a frame displayed at present in the monitor area 22. The duration section 32 is a section to display a duration from the in-point set by the in-point button 27 to the out-point set by the out-point button 29.

Figure 3:
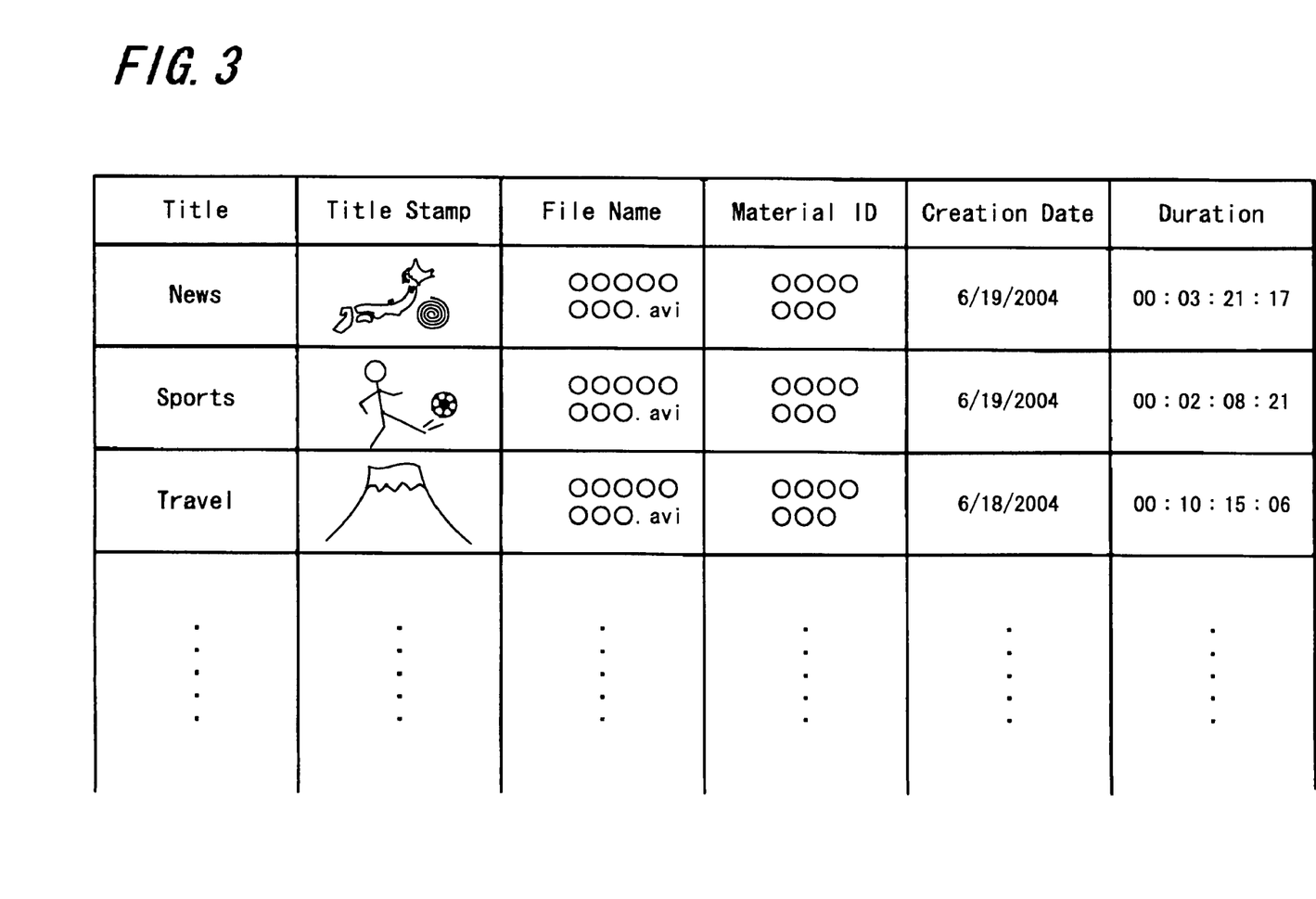
FIG. 3 is a table showing a material list displayed on the management terminal of FIG. 1.

A material list screen is displayed on the display of the management terminal 1 separately from the trimmer window 21. FIG. 3 shows a display example of the material list screen. A title, a title stamp (thumbnail image), a file name, a material ID, a creation date, and a duration of each material file recorded are displayed as a list.

When a drug and drop is performed in the trimmer window 21 of FIG. 2 after clicking by a mouse on this material list screen a section of the material file intended to preview, the relevant material file is selected as a preview object.

Figure 4:
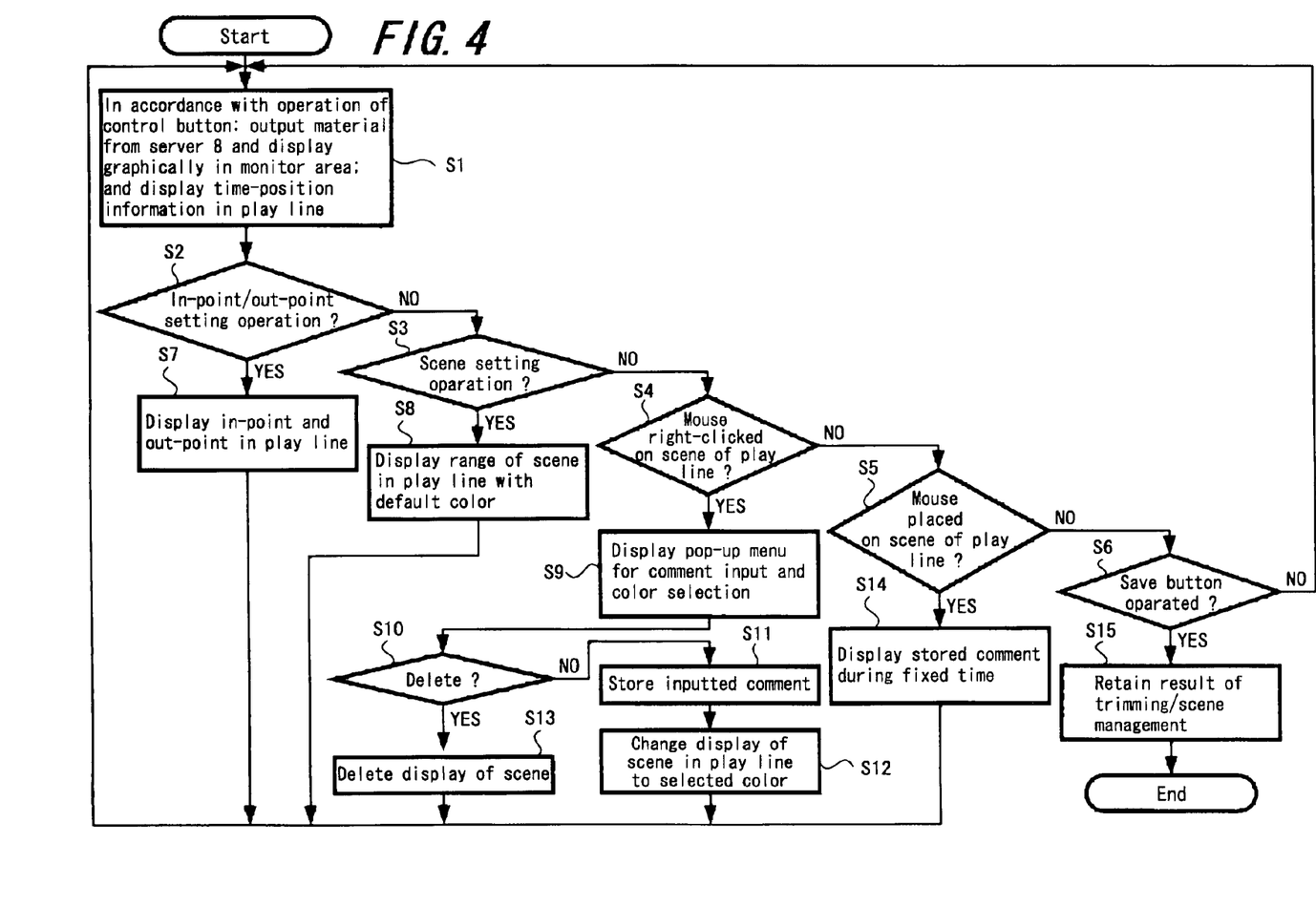
FIG. 4 is a flow chart showing processing in the management terminal with an operation in the trimmer window.

FIG. 4 is a flow chart showing processing executed by a CPU in the management terminal 1 based on an operation in the trimmer window 21 after the material file to be previewed is thus selected.

First, the low resolution video server 8 (FIG. 1) is controlled to output video data of the material file to be previewed in accordance with contents of an operation of the control button 26 at present, and an image of the video data is displayed in the monitor area 22, and time-position information on the material file is displayed in the play line 23. In addition, a time code is also displayed in the present time code section 31 (step S1).

Then, it is judged whether or not there is a setting operation of an in-point and out-point by the in-point button 27 and out-point button 29 (step S2). If the judgment is NO, it is judged subsequently whether or not there is a scene setting operation by the scene-in-point button 24 and scene-out-point button 25 (step S3).

If the judgment is NO, it is judged subsequently whether or not a mouse is right-clicked on a portion displayed as a scene in the play line 23 (step S4). If the judgment is NO, it is then judged whether or not the mouse is placed on the portion displayed as the scene in the play line 23 (step S5).

If the judgment is NO, it is judged subsequently whether or not either the overwrite save button 39 or new file save button 40 is operated (step S6). Further, if even the judgment here is NO, the processing returns to step S1.

When the judgment becomes YES at step S2, the in-point and out-point individually set are stored, and then those positions of the in-point and out-point are displayed in the play line 23. In addition, time codes of those in-point and out-point are displayed in the in-point display section 28 and out-point display section 30, and a duration from the in-point to the out-point is also displayed in the duration section 32 (step S7). Then the processing returns to step S1.

When the judgment becomes YES at step S3, the range of the scene that is set is stored, and this range of the scene is displayed in the play line 23 by using a predetermined default color (for example, a black ground for the play line 23 and gray for this default color) (step S8). Then, the processing returns to step S1.

Figure 5A:
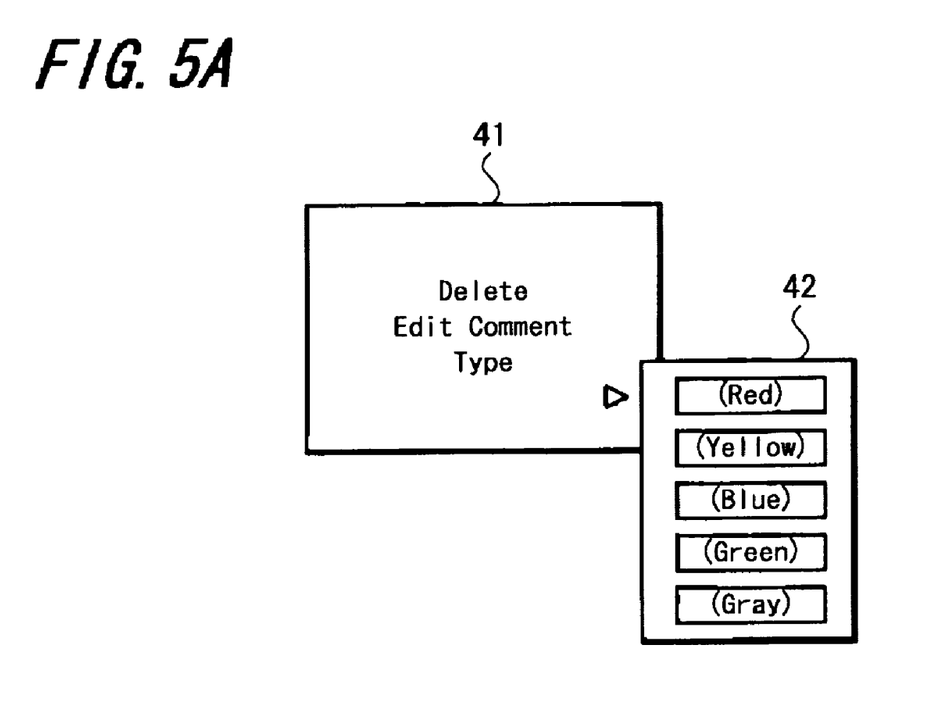
FIGS. 5A and 5B are diagrams showing a pop-up menu for comment input and color selection of a scene.

When the judgment becomes YES at step S4, the pop-up menu for comment input and color selection is displayed with respect to the scene (step S9). FIG. 5 shows an example of this pop-up menu. As shown in FIG. 5A, a command "Delete" to delete a scene, a command "Edit Comment" to input a comment, and a command "Type" to select a display color are provided.

When the mouse is placed on "Type", a sub-menu 42 for selecting a display color is displayed as a drop-down menu. In this example, a command to select one color among five colors of red, yellow, blue, green, and gray (default color) is provided as shown with parentheses in this drawing.

Figure 5B:
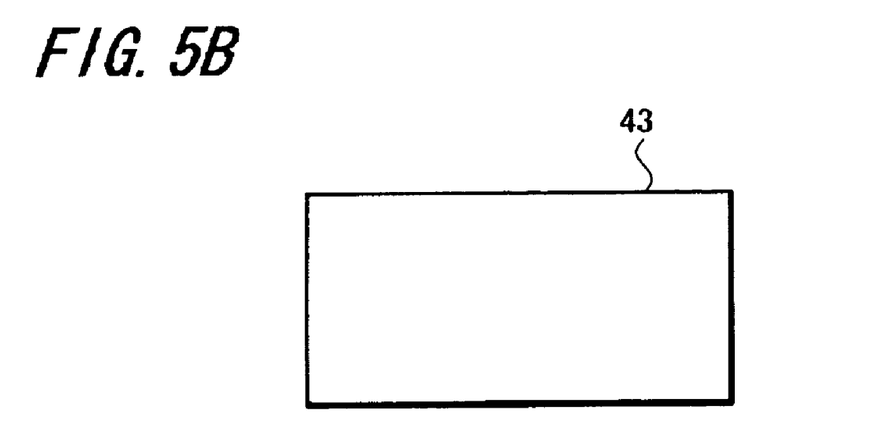

When "Edit Comment" is clicked, a comment input dialog 43 for the input of a desired comment by keys is displayed as shown in FIG. 5B.

In FIG. 4, it is judged whether or not "Delete" is clicked in this pop-up menu subsequently to step S9 (step S10). If the judgment is NO, the comment input into the dialog 43 of FIG. 5B is stored (step S11), and the display color of the scene in the play line 23 is changed into the color selected in the sub-menu 42 of FIG. 5A (step S12). Then, the processing returns to step S1.

On the other hand, if the judgment is YES at step S10, the display of the scene right-clicked immediately before at step S4 is deleted from the play line 23, and the comment stored with respect to the scene is erased (step S13). Then, the processing returns to step S1.

When the judgment becomes YES at step S5, the comment recorded (input into the dialog 43 of FIG. 5B) at step S11 with respect to the scene is displayed during a fixed time (for example, for several seconds) in the vicinity of the display position of the scene in the trimmer window 21 (step S14). Then, the processing returns to step S1.

When the judgment becomes YES at step S6, the result of the trimming (settings of the in-point and out-point) and the setting (designation of the start point and end point of the scene)/management (input of the comment and selection of the display color) of the scene, which are performed in the trimmer window 21, are saved in the data base 2 (FIG. 1) by overwriting as the meta-data on the previewed material file (by the overwrite save button 39), or are saved in the data base 2 as the meta-data on a new material file (by the new file save button 40) (step S15). Then, the processing returns to step S1.

Next, an explanation is made when various pieces of information is displayed in the play line 23 of this trimmer window 21. When an operator operates the control button 26 to preview a material file, the image of video data on the material file output from the video server 8 is displayed in the monitor area 22 and time-position information on the material file is displayed in the play line 23, in accordance with the operation (step S1 of FIG. 4).

Figure 6:
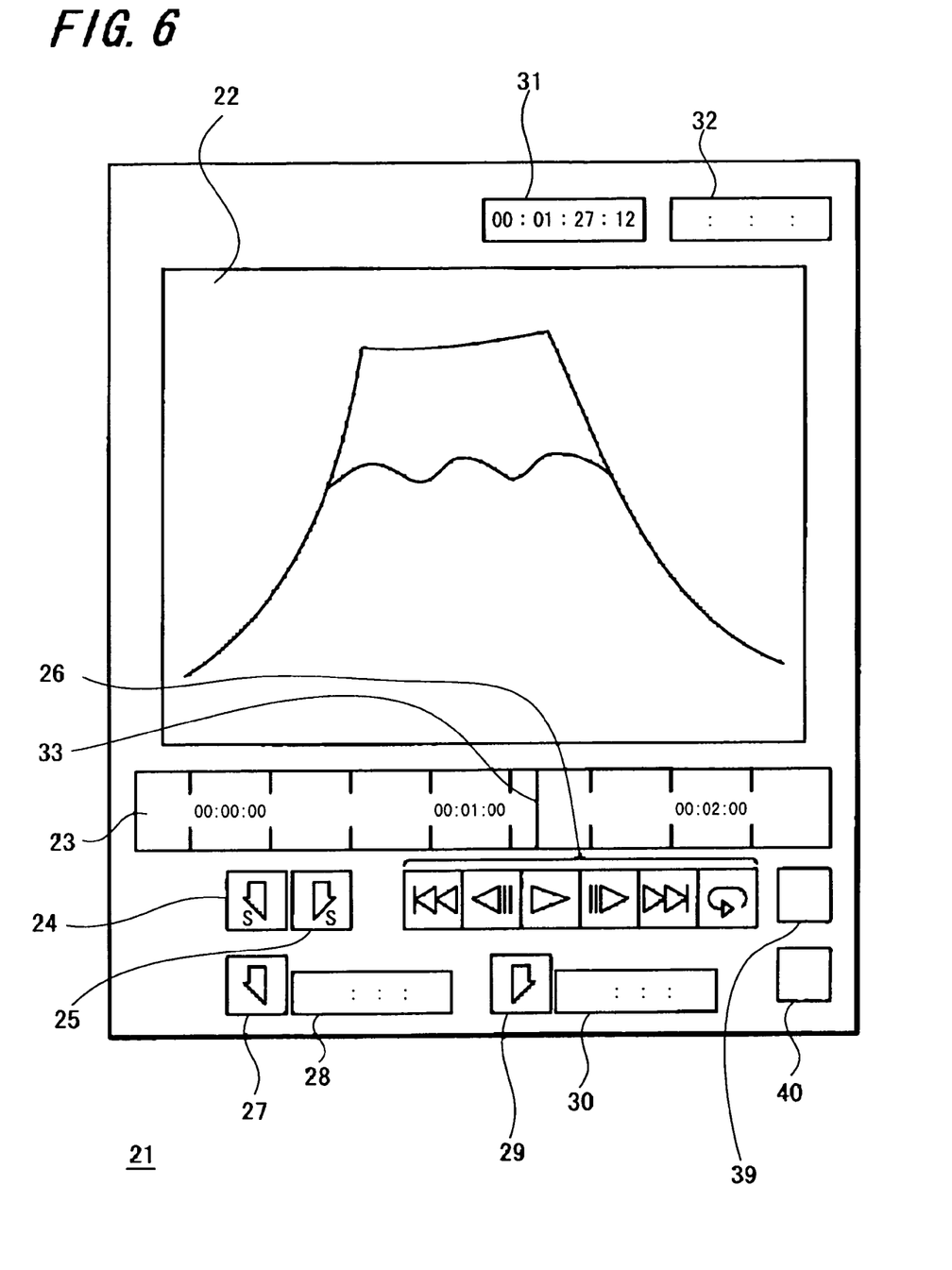
FIG. 6 is a diagram showing a display example of the trimmer window.

FIG. 6 shows a display example of time-position information on a material file in the play line 23. An image of a certain frame of the material file is displayed in the monitor area 22 in accordance with the contents of operation of the control button 26. Further, the time-position information before and after the frame displayed at present in the monitor area 22 is displayed in the play line 23 using a scale marked by the unit of 20 seconds (where numerals of hour, minute, and second such as '00:00:00', '00:01:00', '00:02:00' are added to every three broken lines in the vertical direction). Moreover, in the play line 23, a position bar 33 in the vertical direction is displayed at a position of the time-position of the frame displayed at present in the monitor area 22.

When in order to clip a necessary portion within the material the operator operates the in-point button 27 and out-point button 29 while previewing the image of the desired frame in the monitor area 22 by controlling the control button 26, those positions of the in-point and out-point are displayed in the play line 23 (steps S2 and S7 of FIG. 4).

Figure 7:
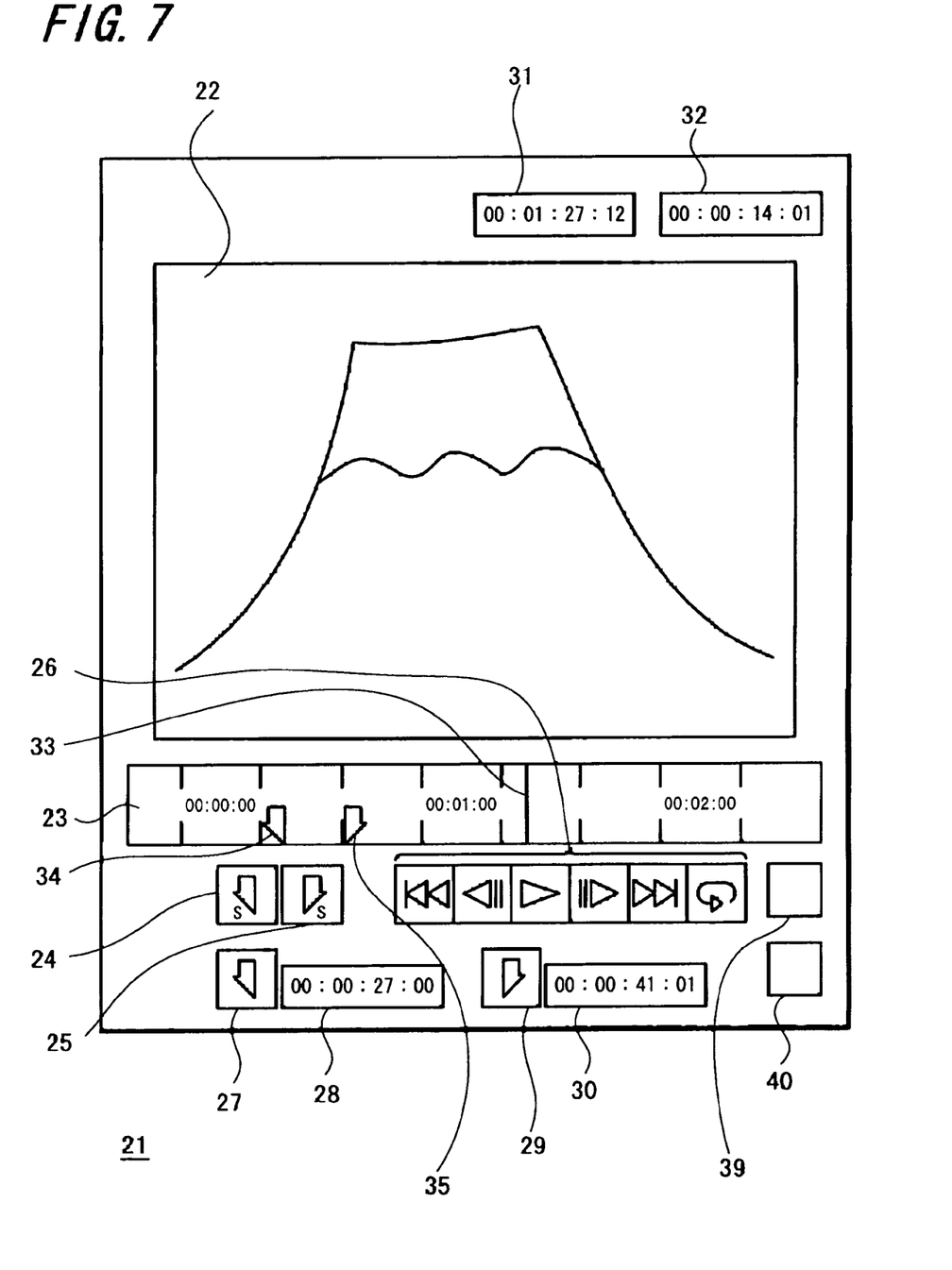
FIG. 7 is a diagram showing a display example of the trimmer window.

FIG. 7 shows a display example of those in-point and out-point in the play line 23 (a state in which the image of the same frame as FIG. 6 is displayed in the monitor area 22). An icon 34 indicating the in-point and an icon 35 indicating the out-point are displayed.

On the other hand, when the operator operates the scene-in-point button 24 and the scene-out-point button 25 in order to set a range pertinent to a certain condition (for example, the range is copyrighted and needs to obtain a permission of a copyright owner) as a scene while previewing the image of the desired frame in the monitor area 22 by operating the control button 26, the range of the scene is displayed with the default color (gray as described above) in the play line 23 (of black ground as described above) (steps S3 and S8 of FIG. 4).

Figure 8:
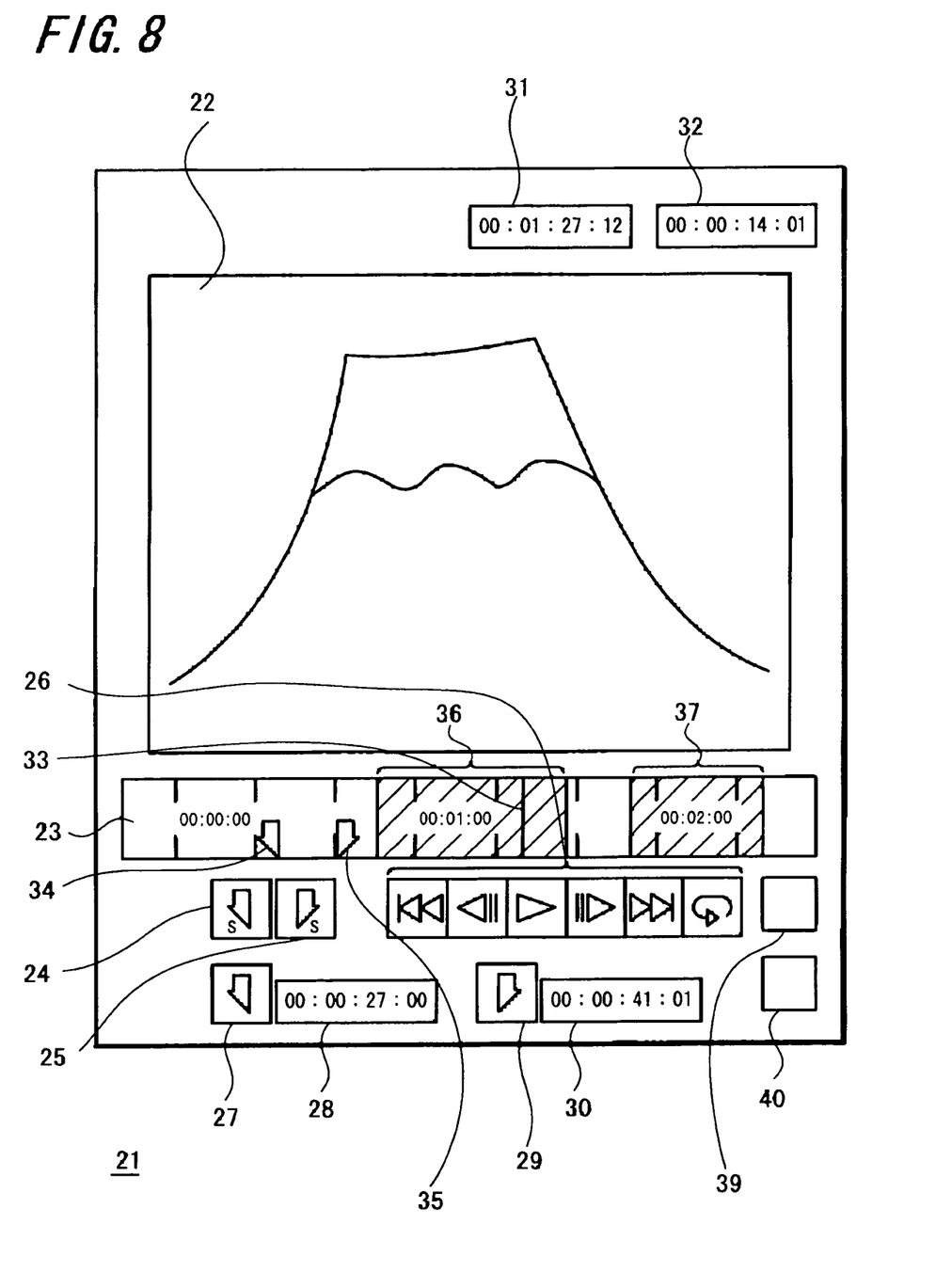
FIG. 8 is a diagram showing a display example of the trimmer window.

FIG. 8 shows a display example of the range of the scene in the play line 23 (a state in which the image of the same frame as FIG. 6 is displayed in the monitor area 22 and the in-point and out-point are set at the same positions as FIG. 7). Two scenes 36 (shaded portion) and 37 (shaded portion) are discriminatively displayed in the play line 23.

When the operator right-clicks the mouse on a display portion of a scene of the play line 23 in order to display the pop-up menu for comment input and color selection with respect to the scene after the scene is thus set and when a comment is input and a display color is selected, the comment is stored in the management terminal 1 and the display color of the scene is changed in the play line 23 (steps S4, and S9 through S12 of FIG. 4).

Figure 9A:
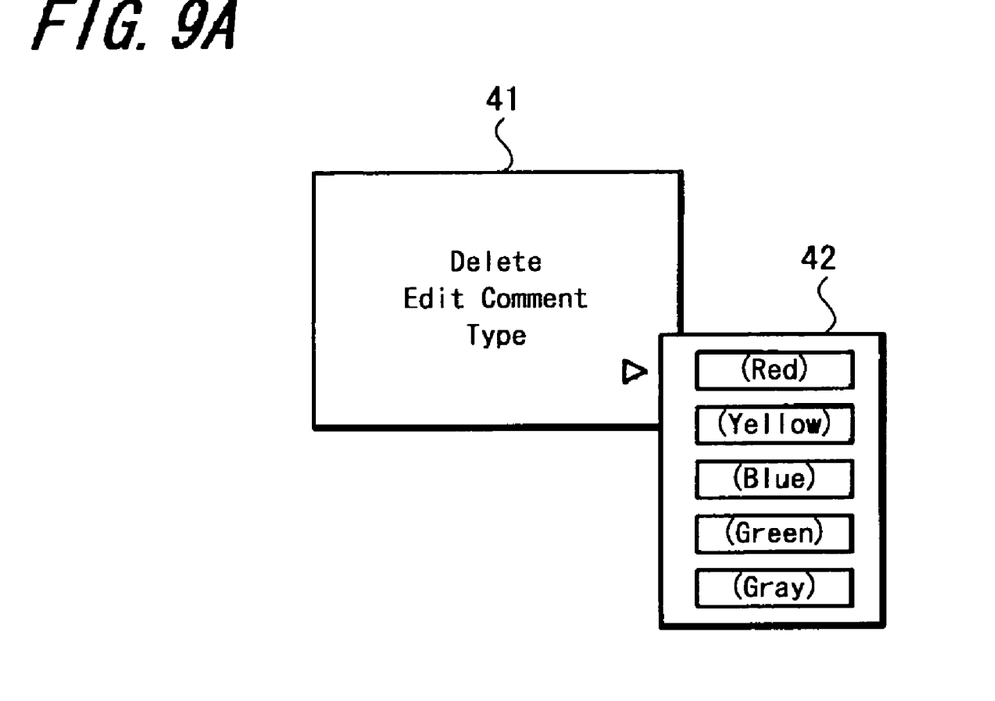
FIGS. 9A and 9B are diagrams showing an input example of the pop-up menu for comment input and color selection.
Figure 9B:
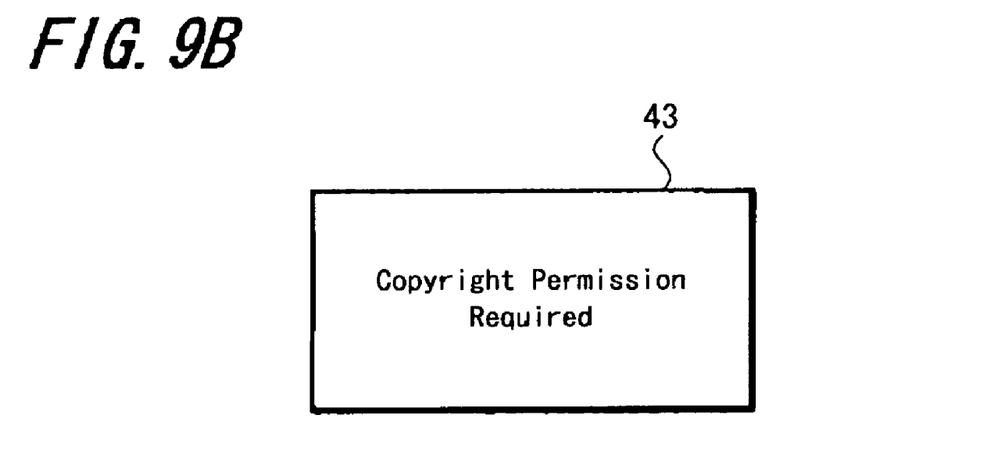

FIG. 9 shows an input example of a comment in the pop-up menu with respect to the scene 36 of FIG. 8. Since the scene 36 is the range which requires the permission of the copyright owner, a comment of "copyright permission required" is input and this comment is stored in the management terminal 1. Further, when red is selected as the display color, for example, due to a reason that an attention should be paid when using the material that needs the permission of the copyright owner, the scene 36 is displayed in red in the play line 23.

When the operator places the mouse on the display portion of the scene in the play line 23 after the input of the comment and the like is thus performed with respect to the scene, the comment on the scene that is input is displayed in the vicinity of the display position of the scene in the trimmer window 21 during a fixed time (steps S5 and S14 of FIG. 4).

Figure 10:
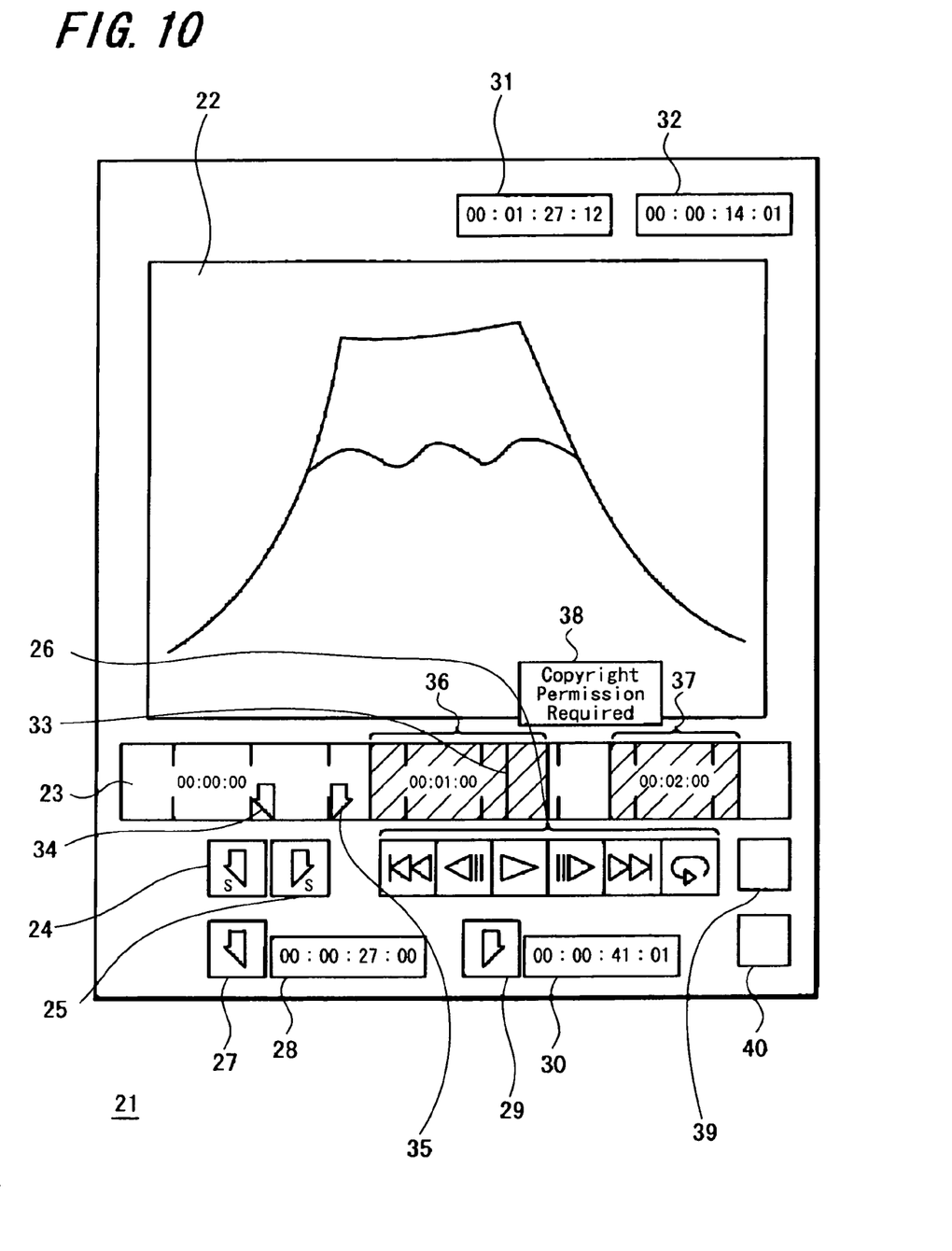
FIG. 10 is a diagram showing a display example of the trimmer window.

FIG. 10 shows a display example of this comment on the scene 36 of FIG. 8. "Copyright permission required" (FIG. 9) that is the comment input by means of the pop-up menu is displayed in the vicinity of the display position of the scene 36.

Further, when the operator operates the overwrite save button 39 or the new file save button 40 after thus performing the trimming and the setting/management of the scene, results thereof are saved in the data base 2 (FIG. 1) (steps S6 and S15 of FIG. 4).

As described above, in this management terminal 1, while previewing a video material on a GUI screen that is the trimmer window 21, a certain range of the video material can be set as a scene to be confirmed in the play line 23 in which the time-position information on the video material is displayed and also a comment on the scene can be input, and the range of the scene which is set and the comment which is input are stored as additional information (meta-data).

Accordingly, both of an operation of previewing and an operation of specifying and managing a certain range of a video material as a scene can be performed under a unified operation environment on the same GUI screen at the time of previewing the video material. Therefore, a certain range of a video material can be specified and managed efficiently at the time of previewing the video material.

Further, a scene can be displayed in the play line 23 with a different color in accordance with an attribute of the set scene (for example, where the scene is copyrighted or the scene is specified by another reason). Therefore, an attribute of a scene individually set can be understood visually and instantaneously.

Note that in the examples described above, the play line 23 is a laterally-long display section (in which the time-position information is displayed continuously in the lateral direction), however, the shape thereof is not limited thereto and the play line 23 may be a vertically-long display section (in which the time-position information is displayed continuously in the vertical direction).

Further, in the examples described above, the monitor area 22 is provided in the same trimmer window 21 as the play line 23. However, not limited thereto, a monitor area is provided as a separate window from the trimmer window 21 such that the separate window and trimmer window 21 are displayed side by side. In that case, both of an operation of previewing and an operation of specifying and managing a certain range of a video material as a scene are also performed under a unified operation environment on the same GUI screen (trimmer window 21) at the time of previewing the video material.

Further, in the examples described above, the management terminal 1 is made of a computer in which software is installed, however, not limited thereto and the management terminal 1 may be made of a dedicated hardware device.

Furthermore, in the examples described above, the present invention is applied to a recording, editing, and transmitting system in a television broadcasting station, however, the present invention can be applied to other video material editing systems than the above.

It should be understood by those skilled in the art that various modifications, combinations, sub-combinations and alterations may occur depending on design requirements and other factors insofar as they are within the scope of the appended claims or the equivalents thereof.

What is claimed is:

1. A video material management apparatus comprising:
first processing means for displaying on display means a graphical user interface screen which includes an image display section, a time-position information display section for displaying time-position information on a video material continuously from beginning to end, a preview operation unit for previewing the video material, and a scene setting operation unit for setting a certain range of the video material as a scene,
wherein the scene setting operation unit includes two sets of buttons operable to select a range of video data, including:
in-point and out-point buttons for performing trimming; and
scene-in-point and scene-out-point buttons for specifying a start point and an end point of the video material in order to set a range of the video material pertinent to copyright information according to a displayed indicia indicating the video material in the range is copyrighted and permission from the copyright owner is required;
second processing means for displaying in said image display section a video material reproduced from recording means and for displaying time-position information on the video material in said time-position information display section in accordance with an operation of said preview operation unit;
third processing means for storing the range of the scene based on the setting of the scene in said scene setting operation unit with respect to the video material displayed in said image display section and for displaying the range of the scene discriminatively in said time-position information display section;
fourth processing means for displaying on said display means an input section for the input of a comment identifying the copyright information, the comment displayed on the scene set in said scene setting operation unit when an operator places a mouse in the time-position information display section;
fifth processing means for storing the comment input into said input section;
processing means for displaying on said display means a selection section to perform an operation of selecting a color for displaying the scene set in said scene setting operation unit; and
processing means for displaying the range of said scene in said time-position information display section with the color selected in said selection section.

2. A video material management method comprising:
a first step of displaying on display means a graphical user interface screen which includes an image display section, a time-position information display section for displaying time position information on a video material continuously from beginning to end, a preview operation unit for previewing the video material, and a scene setting operation unit for setting a certain range of the video material as a scene,
wherein the scene setting operation unit includes two sets of buttons operable to select a range of video data, including:
in-point and out-point buttons for performing trimming; and
scene-in-point and scene-out-point buttons for specifying a start point and an end point of the video material in order to set a range of the video material pertinent to copyright information according to a displayed indicia indicating the video material in the range is copyrighted and permission from the copyright owner is required;

a second step of displaying in said image display section a video material reproduced from recording means and of displaying time-position information on the video material in said time-position information display section in accordance with an operation of said preview operation unit;

a third step of storing the range of the scene based on the setting of the scene in said scene setting operation unit with respect to the video material displayed in said image display section and of displaying the range of the scene discriminatively in said time-position information display section;

a fourth step of displaying on said display means an input section for the input of a comment identifying the copyright information, the comment displayed on the scene set in said scene setting operation unit when an operator places a mouse in the time-position information display section;

a fifth step of storing the comment input into said input section;

displaying on said display means a selection section to perform an operation of selecting a color for displaying the scene set in said scene setting operation unit; and displaying the range of said scene in said time-position information display section with the color selected in said selection section.

3. A non-transitory computer-readable recording medium capable of being read by a computer, in which a program is recorded, the program when executed by the computer causes the computer to execute:

a first step of displaying on display means a graphical user interface screen which includes an image display section, a time-position information display section for displaying time position information on a video material continuously from beginning to end, a preview operation unit for previewing the video material, and a scene setting operation unit for setting a certain range of the video material as a scene, wherein the scene setting operation unit includes two sets of buttons operable to select a range of video data, including:

in-point and out-point buttons for performing trimming; and scene-in-point and scene-out-point buttons for specifying a start point and an end point of the video material in order to set a range of the video material pertinent to copyright information according to a displayed indicia indicating the video material in the range is copyrighted and permission from the copyright owner is required;

a second step of displaying in said image display section a video material reproduced from recording means and of displaying time-position information on the video material in said time-position information display section in accordance with an operation of said preview operation unit;

a third step of storing the range of the scene based on the setting of the scene in said scene setting operation unit with respect to the video material displayed in said image display section and of displaying the range of the scene discriminatively in said time-position information display section;

a fourth step of displaying on said display means an input section for the input of a comment identifying the copyright information, the comment displayed on the scene set in said scene setting operation unit when an operator places a mouse in the time-position information display section;

a fifth step of storing the comment input into said input section;

a sixth step of displaying on said display means a selection section to perform an operation of selecting a color for displaying the scene set in said scene setting operation unit; and a seventh step of displaying the range of said scene in said time-position information display section with the color selected in said selection section.

4. A non-transitory computer-readable recording medium for storing a program for video material management, wherein the program comprises:

a first step of displaying on display means a graphical user interface screen which includes an image display section, a time-position information display section for displaying time position information on a video material continuously from beginning to end, a preview operation unit for previewing the video material, and a scene setting operation unit for setting a certain range of the video material as a scene, wherein the scene setting operation unit includes two sets of buttons operable to select a range of video data, including:

in-point and out-point buttons for performing trimming; and scene-in-point and scene-out-point buttons for specifying a start point and an end point of the video material in order to set a range of the video material pertinent to copyright information according to a displayed indicia indicating the video material in the range is copyrighted and permission from the copyright owner is required;

a second step of displaying in said image display section a video material reproduced from recording means and of displaying time-position information on the video material in said time-position information display section in accordance with an operation of said preview operation unit;

a third step of storing the range of the scene based on the setting of the scene in said scene setting operation unit with respect to the video material displayed in said image display section and of displaying the range of the scene discriminatively in said time-position information display section;

a fourth step of displaying on said display means an input section for the input of a comment identifying the copyright information, the comment displayed on the scene set in said scene setting operation unit when an operator places a mouse in the time-position information display section; and a fifth step of storing the comment input into said input section;

a sixth step of displaying on said display means a selection section to perform an operation of selecting a color for displaying the scene set in said scene setting operation unit; and a seventh step of displaying the range of said scene in said time-position information display section with the color selected in said selection section.

5. A video material management apparatus comprising:

a first processor for displaying on a display device a graphical user interface screen which includes an image display section, a time-position information display section for displaying time-position information on a video material continuously from beginning to end, a preview operation unit for previewing the video material, and a scene setting operation unit for setting a certain range of the video material as a scene, wherein the scene setting operation unit includes two sets of buttons operable to select a range of video data, including:

in-point and out-point buttons for performing trimming; and scene-in-point and scene-out-point buttons for specifying a start point and an end point of the video material in order to set a range of the video material pertinent to copyright information according to a displayed indicia indicating the video material in the range is copyrighted and permission from the copyright owner is required;

a second processor for displaying in said image display section a video material reproduced from a recording device and for displaying time-position information on the video material in said time-position information display section in accordance with an operation of said preview operation unit;

a third processor for storing the range of the scene based on the setting of the scene in said scene setting operation unit with respect to the video material displayed in said image display section and for displaying the range of the scene discriminatively in said time-position information display section;

a fourth processor for displaying on said display device an input section for the input of a comment identifying the copyright information, the comment displayed on the scene set in said scene setting operation unit when an operator places a mouse in the time-position information display section; and a fifth processor for storing the comment input into said input section;

a processor for displaying on said display means a selection section to perform an operation of selecting a color for displaying the scene set in said scene setting operation unit; and a processor for displaying the range of said scene in said time-position information display section with the color selected in said selection section.

* * * * *